US006744865B2

(12) United States Patent
Lahutsky

(10) Patent No.: US 6,744,865 B2
(45) Date of Patent: Jun. 1, 2004

(54) MONITORING SYSTEM

(76) Inventor: Tammy Jane Smith Lahutsky, 2908 Khyber Pass, Plano, TX (US) 75075

( * ) Notice: Subject to any disclaimer, the term of this patent is extended or adjusted under 35 U.S.C. 154(b) by 120 days.

(21) Appl. No.: 10/235,562

(22) Filed: Sep. 5, 2002

(65) Prior Publication Data

US 2004/0047456 A1 Mar. 11, 2004

(51) Int. Cl.[7] ........................ H04M 11/00; H04M 11/04
(52) U.S. Cl. ..................................... 379/102.01; 379/49
(58) Field of Search ........................ 379/37–51, 102.01, 379/102.05, 102.07, 102.02, 142.06, 142.04, 142.01; 340/825.22, 825.69, 825.72, 533, 539.1

(56) References Cited

U.S. PATENT DOCUMENTS 4,918,717 A * 4/1990 Bissonnette et al. .......... 379/40
4,996,703 A * 2/1991 Gray .......................... 379/40
5,978,457 A * 11/1999 Feuerstein et al. ............ 379/51

* cited by examiner

*Primary Examiner*—Wing F. Chan
(74) *Attorney, Agent, or Firm*—Harold Levine, P.C.

(57) ABSTRACT

A monitoring system especially adapted for remote surveillance. Listening and/or visual devices such as microphones or video cameras (hereinafter "monitors" or "surveillance devices") are disposed in selected rooms or other selected areas. These are interconnected by communications paths to one or more communication/control modules (hereinafter "modules") which in turn communicate over wired or wireless paths to a remotely located telephone. The remotely located telephone may be of the cellular or conventional hard wired type from which a user can communicate with the module either to conduct conventional audible conversations or to visually/audibly monitor activities within a selected area.

20 Claims, 2 Drawing Sheets

MONITORING SYSTEM

This invention relates to monitoring systems and more particularly to monitoring systems adapted for remote accessibility.

Remotely accessible monitoring systems have heretofore been proposed, illustrative of which are those described in U.S. Pat. Nos. 2,898,405 granted to G. H. Eck on Aug. 4, 1959; 3,038,965 granted to M. J. Civitano on Jun. 12, 1962; 3,530,250 granted to G Schaum et al on Sep. 22, 1970 and 4,527,015 granted to Colin T. Chambers et al. On Jul. 2, 1985.

Other proposals have been made for remotely accessible monitoring systems, illustrative of which are Japanese Patent JP363227253A "Remote Supervisory and Controlling System" published Sep. 21, 1988; and Japanese Patent JP363018754A "Remote Controlling System for Automatic Answering Telephone Set" published Jan. 26, 1988. Although such proposals have addressed selected problems encountered in effectively providing for remote monitoring, there yet have remained certain unresolved drawbacks to their use. Thus, among other problems, there have continued to be limitations in their use. Accordingly, there has continued to be a need for remotely accessible distributed monitoring systems which provide for comprehensive monitoring while maintaining ease and simplicity in accessibility and control.

BRIEF SUMMARY OF THE INVENTION

The improved system according to the invention hereof includes simple and cost effective features that ameliorate adverse conditions and characteristics heretofore associated with prior use and conditions. Thus, in accordance with the preferred embodiment hereof, flexibility and comprehensiveness are provided through inclusion of a communication and control module through which a plurality of surveillance elements e.g., sensors/monitors, are controlled and from which desired monitoring information is received and transmitted to a remote location.

In the preferred embodiment, the aforementioned communication and control module includes caller identification to distinguish between authorized monitoring and ordinary telephone calls. According to such, one may condition the system, when employing caller identification, to recognize an authorized telephone number at the beginning of a call and automatically set the system to a monitoring mode, while calls from other telephone numbers may actuate normal telephonic communication. In addition, the system can be programmed for call identification and monitoring with more than one authorized access number. It also can be programmed to permit monitoring access by any remote telephonic type device upon entry of one or more authenticating codes.

Again, in the preferred embodiment, when the module is in the monitoring mode, the keys on a conventional touch-tone pad can be designated to effect operations such as adjusting volume control, selecting and/or changing a room or area to be monitored, selecting monitors and/or changing their fields of view (if the monitor is of the video type), and switching to a telephonic mode. When the system is in the normal telephonic mode, selected keys can be programmed so that authorized users can switch from the normal telephonic mode to a monitoring mode. Thus, the system comprises a surveillance and control system for selectively monitoring and controlling sensors at remote locations having a plurality of surveillance devices severally located at said remote locations; an interrogating device having a keypad; said keypad having a plurality of keys severally representing predetermined actions, said predetermined actions including: individual identification and control of said surveillance devices, audio volume control, and normal telephonic communication; a caller identification and control module located at one of said remote locations; a first communication and control path linking said interrogating device with said caller identification and control module; and wireless communication paths linking said surveillance devices to said module; whereby when said interrogating device is activated and a first predetermined key is depressed, said normal telephonic communication is effected; when another predetermined key is depressed, the surveillance device at a predetermined one of said remote locations is selected; and when another predetermined key is selected, volume control of said selected surveillance device is effected.

The method, according to the invention is a method of activating and operating the surveillance and control system to selectively monitor and control sensors at remote locations and includes the steps of severally disposing a plurality of sensors at selected locations in a remote location; providing a telephone set having a keypad with a plurality of keys; severally designating said keys with selected predetermined actions including individual designation and control of said sensors, volume control and normal telephonic communication; disposing a caller identification and control module at said remote location; establishing a first communication and control path linking said telephone set with said caller identification and control module; establishing wireless communication paths linking said sensors to said module; pressing a first predetermined one of said keys to effect normal telephonic communication between said telephone and said remote location; pressing another predetermined one of said keys to select one of said sensors; and pressing a different predetermined one of said keys to control audio volume of said one of said sensors.

OBJECTS AND FEATURES OF THE INVENTION

It is one general object of the invention to improve remote monitoring systems.

It is another object of the invention to facilitate selective monitoring of remote locations.

It is yet another object of the invention to reduce cost and complexity of remote monitoring systems;

It is yet another object of the invention to enhance versatility of operation of remote monitoring systems.

It is still another object of the invention to reduce cost through partial utilization of existing equipment such as call identification apparatus.

Accordingly, in accordance with one feature of the invention, a conventional touch tone telephone can be used for conventional voice communication or to remotely control a monitoring module, thereby contributing to simplicity and cost effectiveness.

In accordance with another feature of the invention, selected touch tone keys can be utilized to selectively control the system as well as for dialing a desired telephone number.

In accordance with yet another feature of the invention, the system can optionally be conditioned to automatically recognize authorized access through caller identification.

In accordance with still another feature of the invention, provision is additionally made for entering authenticating codes and numbers such as pin numbers to permit access from numbers not otherwise authorized through caller identification.

These and other objects and features of the invention will be apparent from the following description, by way of example of a preferred embodiment, with reference to the drawing.

DESCRIPTION OF A PREFERRED EMBODIMENT

Figure 1:
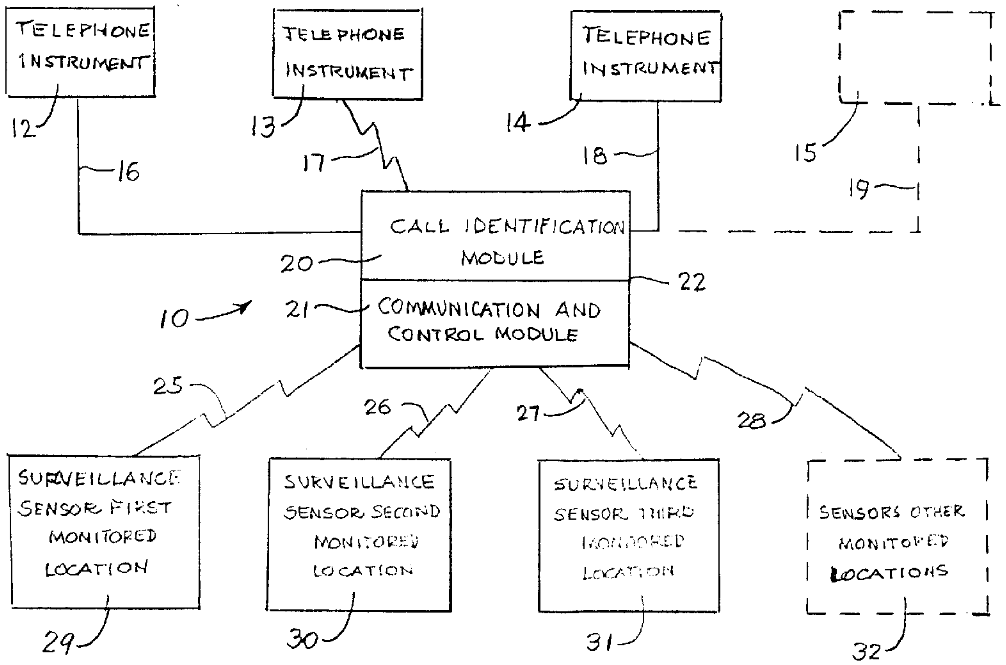
FIG. 1 is a diagram illustrating the principal components of the preferred system according to the invention.

Now turning to the drawing, and more particularly FIG. 1 thereof, it will be seen to be a diagram 10 illustrating the principal components of the preferred system according to the invention. There, it will be observed are telephone instruments 12, 13 and 14 which are connected via communication paths 16, 17 and 18 to caller identification module 20. To illustrate the fact that additional telephone instruments and communication paths may be included, telephone 15 and communication path 19 are shown in phantom. Also, it should be noted that communication link 17 is illustrated by a non rectilinear line so as to depict wireless communication. Thus, communication between telephones 12–14 and module 20 may be by wired or wireless links.

Call Identification Module 20 is conventional and provides automatic identification of incoming calls. As such, automatic identification of incoming calls is an important aspect of the system hereof.

To illustrate the close coordination of call identification and automatic activation of the system, the call identification module 20 and communication and control module 21 are shown as parts of larger rectangle 22.

Connected to module 21 by wireless communication links 25, 26, 27 and 28 are one or more surveillance sensors 29, 30, 31 and 32 which are located at first, second, third and fourth monitored locations respectively. As with telephonic device 15 and link 19 above, communication link 28 and surveillance device 32 are shown in phantom to denote that there may be a plurality of additional surveillance devices and communication links.

Figure 2:
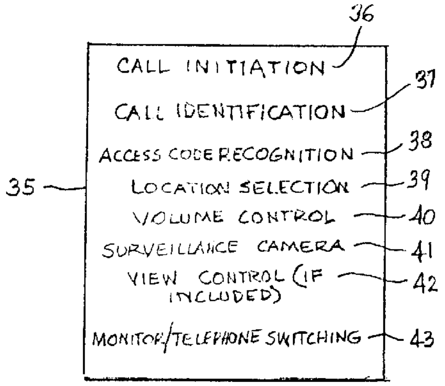
FIG. 2 is a diagram illustrating steps in operating the system of FIG. 1.

Now turning to FIG. 2, it will be seen to be a rectangle 35 further depicting steps in operating the system of FIG. 1. There, in FIG. 2 are call initiation 36, caller identification 37, authorized access code recognition 38, location selection 39, volume control 40 for audio devices (e.g., sensors such as microphones), operation of optional surveillance camera(s) 41 if desired., view control 42 of camera(s), and switching between the monitoring mode and normal telephone mode 43.

Figure 3:
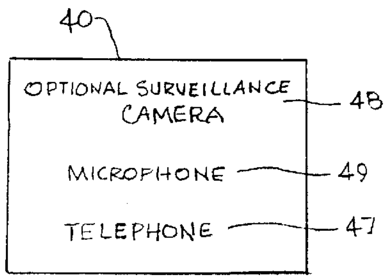
FIG. 3 is a diagram identifying components preferably disposed in at least some of the areas under surveillance.

As mentioned above, FIG. 3 depicts equipment positioned at each location selected for monitoring. There, within rectangle 45, are shown a microphone 46, an optional telephone 47 and an optional surveillance camera 48. It should be noted that while the preferred embodiment envisions a microphone emplaced in at least one selected location, provision of a telephone and a video camera are optional. Additionally, while in the preferred embodiment one or more telephones would be located at one or more of the aforementioned remote locations, such is not necessary for the operation of the system.

Figure 4:
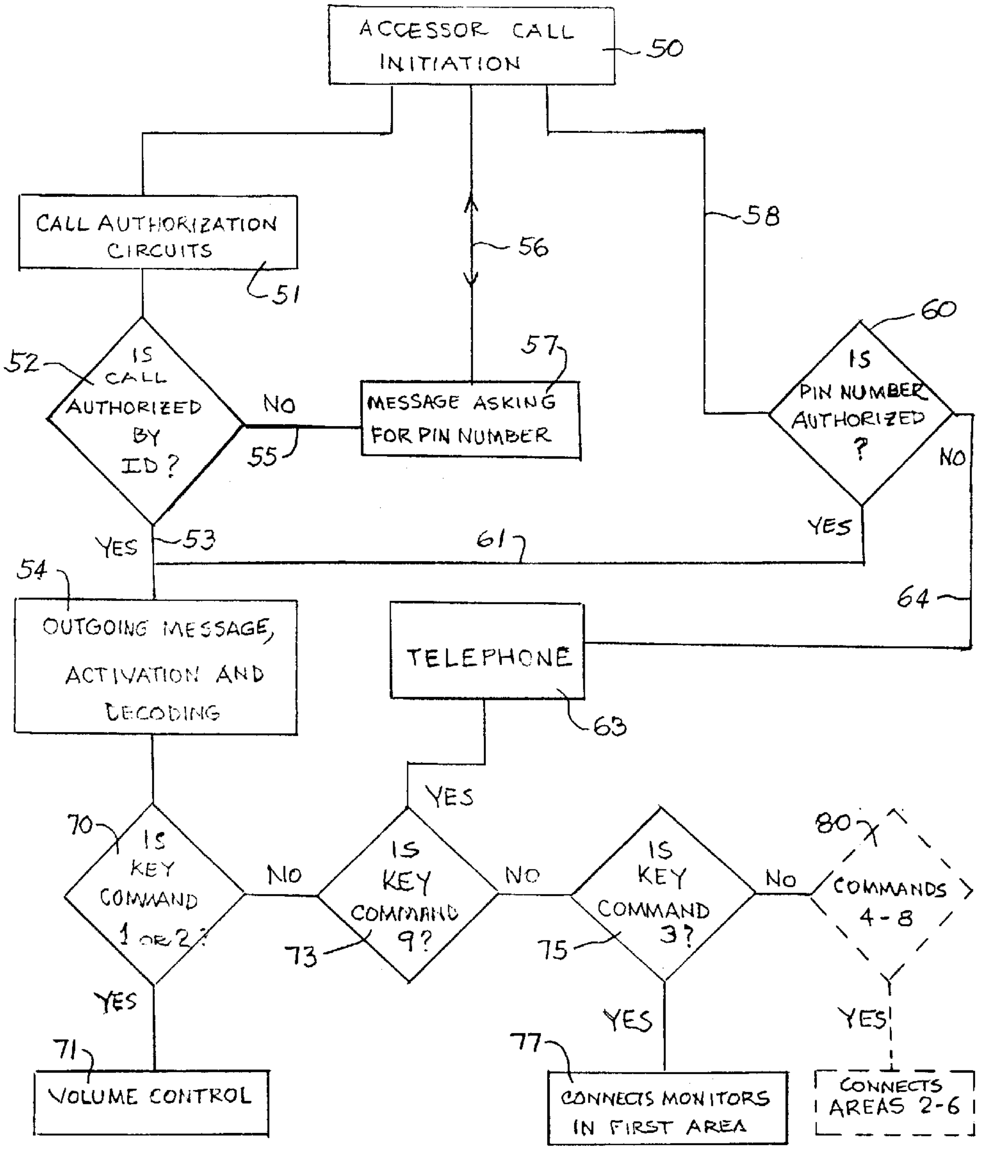
FIG. 4 is a flow diagram illustrating operation of the system.

Now turning to FIG. 4, there, it will be seen, is a flow diagram illustrating operation of the system. Operation is initiated by a request for access normally in the form of a telephone call from a conventional hard-wired or cellular mobile telephone as represented by rectangle 50. Such call is directed to the call identification module 20 (FIG. 1) over a communication path such as paths 16–19. When the call is received at module 20, call recognition occurs within authorization circuits 51 which determine whether the call is from an accessor authorized by Caller ID as represented by diamond 52. If yes, a yes signal is communicated via yes path 53 to Outgoing Message, Decoding and Activation as represented by rectangle 54. Thus, although not required, preferably an outgoing message is returned to the accessor stating that the system is being activated. It should also be noted that the system may be readily programmed by methods well known in the art to recognize several different telephone numbers each having authorization to activate the system. Such is represented by call identification module 20.

If the call is not authorized by Caller ID (as represented by "No" path 55), then a message is sent to the accessor 50 via path 56 as represented by rectangle 57. Such message asks the accessor for either: (1) a personal identification number (PIN) or other code input representing authorization for access, or (2) to enter a digit indicating a desire for connection to a telephone. Although such digit could be any preselected key, for the purposes of this example, it is the digit 9. It should be understood that optionally, the system could readily be set so that if the calling number is not authorized, the call would merely be routed to the telephone without a request for a personal identification number (PIN) or a digit for connection to the telephone.

If a PIN number is then entered, it is communicated via path 58 to diamond 60 "Is PIN Number Authorized?" where it is checked for authenticity. If the answer is yes, then the system proceeds as indicated by path 61 to rectangle 54 representing the aforementioned outgoing message, activation of the system, and decoding of subsequently received digital commands. If, on the other hand, the answer is no, then connection is made to a telephone 63 via path 64.

Once the system is activated, the system invites entry of command as evidenced by "Outgoing Message" within rectangle 54. Such message may expressly invite entry of commands by the accessor, or it may be in the nature of a tone or indication which is recognized by the accessor as representing system activation and invitation to enter commands. Although in the following description, keys 1–9 are employed, it will be evident that the cipher 0 could also be used. Moreover, alpha symbols, combinations of alpha symbols, combinations of numerals and combinations of numerals and alpha symbols could be employed.

In this preferred embodiment, the numbers 1 through 9 are used for control. The numbers 1–2 are for volume control (1 to increase, 2 to decrease); 3 through 8 are used for designating predetermined regions (e.g., rooms) in the area under surveillance; and 9 is used to effect connection to a telephone set. Such are represented by the logic diamonds in the lower part of FIG. 4. Thus, after the system is activated and a control digit is entered, it is identified. Diamond 70 represents checking to determine whether it is a 1 or a 2. If the answer is yes, volume control circuits are activated. If the answer is no, then the digit is examined as at diamond 73 Is Key Command a 9? If the answer is yes, connection is then made to telephone 63. If, on the other hand, the answer is no, then the system proceeds to identify which of the remaining digits 3–8. This is represented by diamond 75 which asks if the digit is a 3. If it is, the monitor(s) in a first area are connected as represented by rectangle 77. The system proceeds in a similar manner to identify numbers 4 through 8 as represented by diamond 80 which is shown in phantom. Numbers 4 through 8 represent, respectively areas 2 through 6.

Once the selected area is chosen and the monitors thereat are thereby connected, the output of the microphone or other surveillance device (e.g., video camera) located is communicated through the system to the accessor who then can hear what is occurring in the monitored area or can view the same if a visual monitor is included. If he desires to change the selected area, he can merely enter the digit associated with the desired area, whereupon the system processes the newly entered digit as represented by diamonds 70, 73, 75 and 80 to effect connection to sensors in the newly selected location.

Although automatic recognition and activation may be achieved through Caller ID or the entry of one or more PIN numbers as described above, successive levels of security my readily be introduced through successive interrogation of PIN numbers. Thus, for example, the system may readily be set so that in addition to caller identification by Caller ID, instead of immediate activation, the system may ask the accessor for one or more additional authorization indicia such as one or more pin numbers before becoming activated.

It now be evident that many desired operations can be optionally included. Thus, one of the digits 3–8 could be reserved for activating all (or selected ones) of the surveillance devices simultaneously, either at the outset or during monitoring operation. Alternatively, double digits or other key strokes could be employed to achieve such.

It should also be understood that the Caller ID and attendant circuitry could be set to recognize more than one calling telephone number as being authorized to activate the system.

It will now be evident that there has been described herein an improved surveillance and monitoring system exhibiting improved simplicity and ease of use.

Although the invention hereof has been described by way of a preferred embodiment, it will be evident that adaptations and modifications may be employed without departing from the spirit and scope thereof For example, a keypad other than that on a conventional telephone could be employed.

The terms and expressions employed herein have been used as terms of description and not of limitation; and thus, there is no intent of excluding equivalents, but on the contrary it is intended-to cover any and all equivalents that may be employed without departing from the spirit and scope of the invention.

What is claimed is:

1. A surveillance and control system for selectively monitoring and controlling sensors at remote locations comprising:

a. a plurality of surveillance devices severally located at said remote locations;

b. an interrogating device having a keypad; said keypad having a plurality of keys severally representing predetermined actions, said predetermined actions including: individual identification and control of said surveillance devices, and normal telephonic communication;

c. a caller identification and control module located at one of said remote locations;

d. a first communication and control path linking said interrogating device with said caller identification and control module; and e. wireless communication paths linking said surveillance devices to said module; whereby when said interrogating device is activated and a first predetermined key is depressed, said normal telephonic communication is effected; when another predetermined key is depressed, the surveillance device at a predetermined one of said remote locations is selected; and when another predetermined key is selected, volume control of said selected surveillance device is effected.

2. A surveillance and control system according to claim 1 wherein when said interrogating device is a predetermined interrogating device and is activated, said caller identification and control module recognizes said predetermined interrogating device as authorized to access said system and automatically activates said system.

3. A surveillance and control system according to claim 2 wherein when said interrogating device is not said predetermined interrogating device and is activated, said caller identification and control module delays activation of said system until an authorizing code is entered into said interrogating device.

4. A surveillance and control system according to claim 2 wherein when said interrogating device is said predetermined interrogating device and is activated, said caller identification and control module delays activation of said system until an authorizing code is entered into said interrogating device.

5. A surveillance and control system according to claim 1 wherein said remote locations include rooms in a dwelling.

6. A surveillance and control system according to claim 5 wherein said dwelling is a house.

7. A surveillance and control system according to claim 1 wherein said remote locations include predetermined spaces.

8. A surveillance and control system according to claim 1 wherein said keypad of said interrogating device includes alpha designated keys.

9. A surveillance and control system according to claim 1 wherein said keypad of said interrogating device includes numerically designated keys.

10. A surveillance and control system according to claim 1 wherein said keypad of said interrogating device includes alpha-numerically designated keys.

11. A surveillance and control system according to claim 1 wherein said first communication and control path is wireless.

12. A surveillance and control system according to claim 1 wherein said first communication and control path is wired.

13. A surveillance and control system according to claim 1 wherein said surveillance devices include a camera.

14. A surveillance and control system according to claim 1 wherein said interrogating device is a conventional tone dial telephone instrument.

15. A surveillance and control system for selectively monitoring and controlling audio sensors at a dwelling place comprising:

a. a plurality of audio sensors severally located in rooms of said dwelling place;

b. a telephone set having a keypad, said keypad having a plurality of keys severally representing predetermined actions, said predetermined actions including: individual designation and control of said audio sensors including audio volume control, and normal telephonic communication;

c. a caller identification and control module located at said dwelling place;

d. a first communication and control path linking said telephone set with said caller identification and control module; and e. wireless communication paths linking said audio sensors to said module; whereby when said telephone is activated and a first predetermined key is depressed, said normal telephonic communication is effected; when another predetermined key is depressed, the audio sensor in a predetermined one of said rooms is selected; and when another predetermined key is selected, volume control of said audio sensor is effected.

16. A method of activating and operating a surveillance and control system to selectively monitor and control sensors at remote locations comprising:

a. severally disposing a plurality of sensors at selected locations in a dwelling;

b. providing a telephone set having a keypad with a plurality of keys;

c. severally designating said keys with selected predetermined actions including individual designation and control of said sensors, volume control and normal telephonic communication;

d. disposing a caller identification and control module at said dwelling;

e. establishing a first communication and control path linking said telephone set with said caller identification and control module;

f. establishing wireless communication paths linking said sensors to said module;

g. pressing a first predetermined one of said keys to effect normal telephonic communication between said telephone and said dwelling;

h. pressing another predetermined one of said keys to select one of said sensors; and i. pressing a different predetermined one of said keys to control audio volume of said one of said sensors.

17. The method of claim 16 further including:

a. conditioning said caller identification and control module to identify said telephone set when said telephone set is employed to communicate with said module; and b. automatically activating said control system when said telephone set is identified as being authorized to access said system.

18. The method of claim 16 further including:

a. conditioning said caller identification and control module to identify said telephone set when said telephone set is employed to communicate with said module; and b. deferring activation of said control system when said telephone set is identified as being authorized to access said system until an additional authorizing code is transmitted from said telephone set to said module.

19. The method of claim 16 further including:

a. deferring activation of said control system when said telephone set is identified as not being authorized to access said system;

b. prompting said telephone set to enter an access code; and c. when said access code is an authorized access code, for activating said system.

20. The method of claim 16 further including: selectively activating groups of said sensors.

* * * * *